Oct. 1, 1968  JOHN LE ROY BALLARD ETAL  3,404,205
ROLL FORMATION CHARACTERISTICS OF CONTINUOUS FILM
Filed April 13, 1964  2 Sheets-Sheet 1

INVENTORS
JOHN LEROY BALLARD
BRUCE JAMES CASE

BY

ATTORNEY 3,404,205
ROLL FORMATION CHARACTERISTICS OF CONTINUOUS FILM
John Le Roy Ballard, Columbus, Ohio, and Bruce James Case, Southport, Conn., assignors to E. I. du Pont de Nemours and Company, Wilmington, Del., a corporation of Delaware
Filed Apr. 13, 1964, Ser. No. 359,168
5 Claims. (Cl. 264—289)

ABSTRACT OF THE DISCLOSURE

A continuous travelling web of a drawable, organic polymer flat film having at least one substantially straight longitudinal lane of a thickness which deviates from the average thickness across the film is continuously heated, or cooled, along edge lanes of the film just prior to, or in the initial stage of transverse drawing, of the film, by either subjecting the film to uniform heating or cooling in longitudinal sinuous paths, or by subjecting the film in longitudinal paths to cyclically increasing and decreasing levels of heating or cooling, whereby to continuously and cyclically modify to a predetermined degree the drawing characteristics of the film.

---

Figure 1:
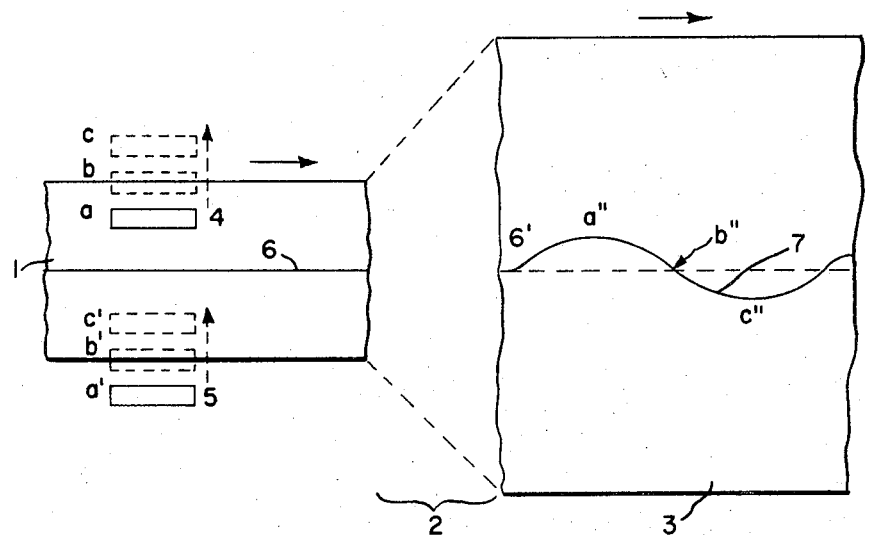

This invention relates to rawable organic polymeric film and more particularly to the production of drawn (stretched) film having improved roll formation characteristics.

In the manufacture of organic polymeric flat films by melt extrusion or casting persistent deviation of thickness from the average along longitudinal lanes produces gauge bands on rolls of film as the lanes are superimposed during windup. These bands cause misshapen rolls and severe wrinkling of the film, and are a major cause of rejection. Efforts to eliminate these at the point of extrusion or casting of the film by adjustment of extrusion hopper lips or elimination of bands subsequent to extrusion by selectively heating deviation lanes of the film have met with only limited success. Furthermore, uncontrolled conditions during processing, such as extraneous air currents over the film while in the softened condition, can produce gauge bands or deviation lanes. For the most part, it is economically unwise to attempt to eliminate these bands; rather it is preferable to minimize the effect on the finished roll.

One means to distribute lanes of gauge variation is to employ a rotating circular die and extrude or cast a tubular film. Subsequent splitting of the tube results in flat film in which lanes wherein the gauge deviates from the average fall along a diagonal path from edge to edge of the flat film. Not all types of films are conveniently adaptable to tubular extrusion, however, and means to achieve gauge band distribution with existing flat die equipment is desired.

The principal object of this invention, therefore, is to provide for the production of drawn continuous flat organic polymeric film capable of being wound to form smooth even rolls. Another and more specific object is to provide methods and means for modifying crystallizable thermoplastic organic flat film to effect continuous predetermined gauge band displacement. The foregoing and additional objects will more clearly appear from the detailed description which follows.

The objects are fully realized by the present invention which comprises continuously modifying to a predetermined degree, drawing characteristics of selected areas of a continuous, drawable, organic polymeric film having at least one substantially straight longitudinal lane of a thickness which deviates from the average thickness across the film, in a predetermined path longitudinal of the film, and stretching the film in the transverse direction whereby the longitudinal lane is displaced laterally alternately towards one edge and then toward the other edge of the film in a wave-like pattern.

The basic mechanism upon which the present invention relies is the effect of modification of selected areas of the film prior to or during drawing to alter the drawing pattern, without changing the conditions of draw, i.e. forces applied or the extent of drawing (stretching), heating, etc. In the production of thermoplastic film the preferred means of this invention to accomplish the desired result is with a mechanically oscillating edge heater which heats alternately on one side and then on the other. Other means to accomplish this result are also effective, but these may vary from one type of film to another, e.g., those which are not thermoplastic and are not crystallizable. These will be disclosed in general detail; the teaching of the preferred method will enable those skilled in the art to achieve the desired result by alternative means.

The preferred method relies on the effect of heat to promote crystallization of a partially crystalline, further crystallizable thermoplastic film. If a film, such as a polyethylene terephthalalate film, which is extruded in the amorphous form, is drawn, i.e., stretched in one direction above the glass transition temperature it partially crystallizes. Subsequent application of intense heat to this film will promote further crystallization. It is in the interval between the first direction drawing and second direction drawing wherein the heat is alternatively applied to opposite edges to effect gauge band displacement. This heating causes a heavying of a particular area due to differential crystallization, and a shifting of stretching pattern toward the heavier portion along the edge. By selection of the extent of heating, the degree of shifting, e.g., the amplitude of the wave, may be controlled. The frequency, or the wave length of the resulting wave pattern of the gauge band can be controlled by the duration of the heating cycle, as will be apparent to those skilled in the art.

Other operable means to achieve distribution of gauge bands in thermoplastic film, utilizing alteration of the stretching or shrinkage pattern of the web, include means such as variable jets of cooling air impinging alternately on the opposite edges of the heated film during transverse stretching in the tenter oven. The control of such air can be by a single valve which first causes the full stream of air to impinge on the area adjacent the first edge, with no air flow to the opposite second edge, followed by gradually diminishing the flow to the first edge while simultaneously increasing flow to the second edge until the condition exists wherein the entire flow of air is to the second edge, with none to the first. The process is repeated, with the entire operation occurring in a continuous cyclic manner.

Understanding of the present invention is facilitated by reference to the accompanying drawings wherein;

FIG. 1 is a schematic view, partially foreshortened, of a film undergoing treatment, by a preferred means of operation of the present invention.

Figure 2:
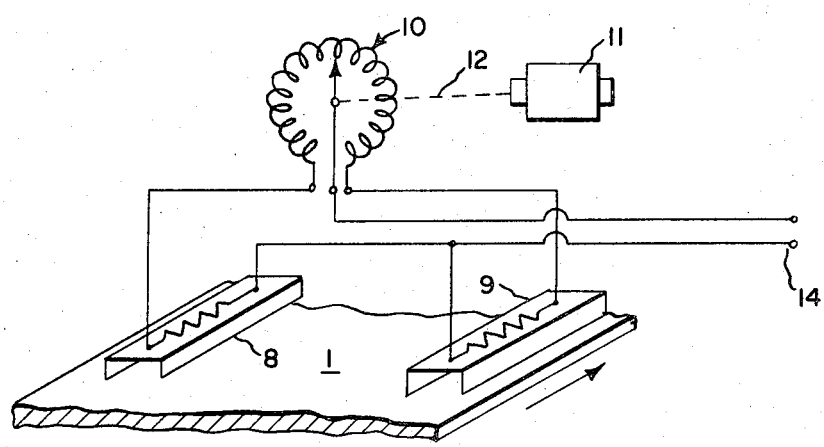
Figure 3:
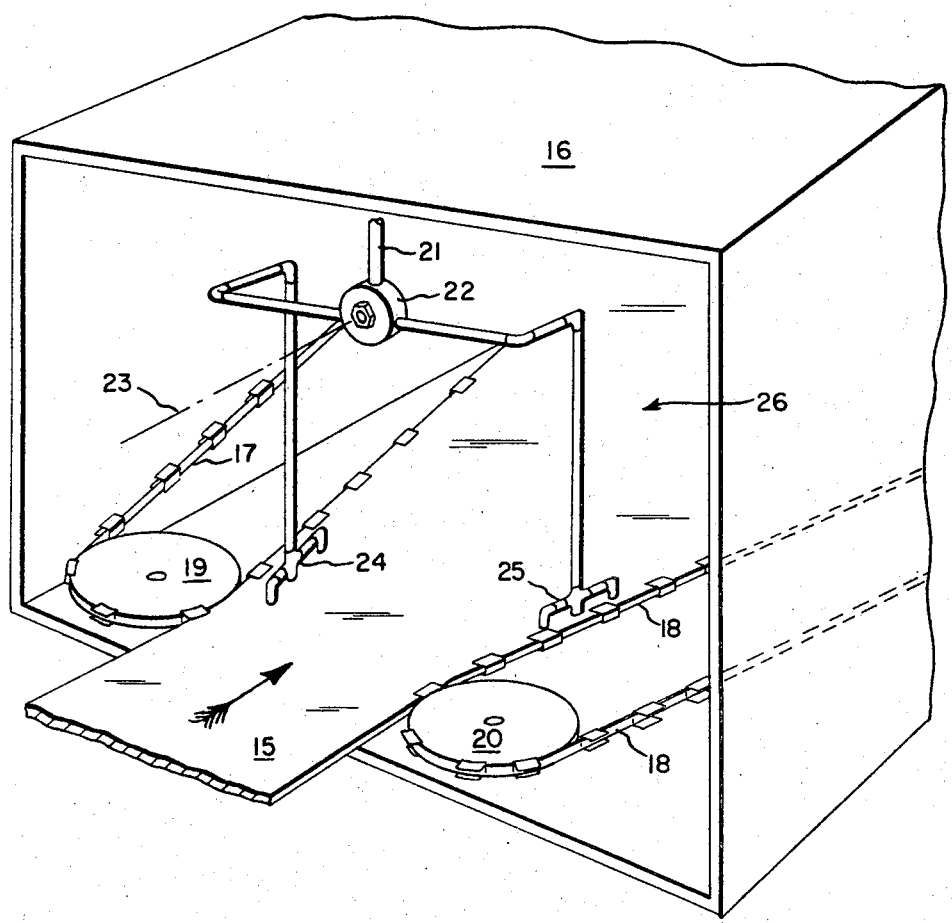

FIG. 2 and FIG. 3 schematically illustrate separate embodiments of apparatus to carry out this invention.

Referring to FIG. 1, a running, continuous film 1 having a longitudinal, substantially straight, lane 6 (shown as a line for purposes of illustration) of a thickness greater than the average thickness across the film, passes through area 2 where it is heated and stretched transversely to the desired extent in a tenter frame (not shown) commonly employed in the art, producing stretched film portion 3. Electric heaters 4 and 5, which move in a plane, parallel to the plane of the film, are preferably radiant heaters of a type known as "Calrod" (General Electric Company). These heaters are mounted on a traversing mechanism (not shown) which moves them in an oscillating manner alternately on and off the opposite edges of the running film. As mentioned hereinbefore, the extent of modification of the film should remain constant so as to provide a smooth curve of oscillation of gauge bands from side to side. Therefore, when heater unit 4 is at position $a$, which is fully over the web, heater unit 5 is completely off the film at position $a'$. As the two units move simultaneously, when unit 4 is at position $b$, unit 5 is at position $b'$, just going off and over the film, respectively. When unit 4 reaches position $c$, completely off the film, unit 5 will be at position $c'$, completely over the film. Power is supplied to each unit at a constant rate, so that the extent of heating, and, therefore the extent of edge modification, is a function of the proximity of the heating units to the film. The combination of continuous cycling to produce constant total edge modification prevents the occurence of nulls or linear portions on the pattern and the superposition of bands. For convenience, deviation lane 6 (there may be and generally are, of course, a plurality of deviation lanes) is shown as being in a substantially straight line equidistant from and parallel to the edges of film portion 1, and as in the wave-like pattern 7 in stretched film portion 3. In actuality, deviation lanes or bands may be, and usually are located along lines at any distance across the film.

The mechanism by which the displacement of deviation bands is achieved in a preferred means is apparent from further reference to FIG. 1. Heater unit 4 when at location $a$ over the film will heat the partially crystallized film, in which crystallization has previously been initiated by a first direction stretching, so that further crystallization occurs. This further crystallization will result in toughened areas adjacent the heater. The extent of further crystallization, and consequently the increase in toughness, is a function of the extent of heating. Therefore, the toughness will vary from a maximum and then decrease gradually to the level of the unmodified value as the heater moves over and then off the edge of film. As the film passes from the alternating edge heaters it immediately moves into the tenter frame where it is gripped on each edge by tenter clips which ride on diverging rails as is well known in the art. This stretches the film transversely; during this stretching the toughened edge does not stretch as easily, i.e., pull away from the clips, as it would had it not been heated. Therefore, when heater unit 4, is at position $a$, deviation lane 6 of film 1 will be shifted by stretching to position $a''$ in stretched film portion 3. Conversely, when heater 5 is fully over the film at position $c'$, maximum edge toughening will result and cause the gauge deviation lane to shift to $c''$ on the stretched film. Nodes $b''$ on the stretched film result from equal modification of opposite edges of the film, whereby no lateral shift of the deviation lane occurs.

A critical feature of the application of heat to modify the edges of a film to effect oscillation of gauge bands is that the film must be incompletely crystallized at the location of heating, and must be further crystallized by such heating. This necessitates attention to the extent of heating prior to edge heating, and to the extent of heating by edge heaters. It has been found effective in the production of polyethylene terephthalate film to employ two heaters of one kilowatt capacity at each station, positioned at a distance of ½ to 1½ inches from the film. This causes a maximum temperature rise of 5° to 20° C., which causes the temperature of the film to rise from approximately 65° C. to 77° C. with a resultant increase in the degree of crystallization. The proper balance of heating to achieve gauge oscillation with any given film material will be apparent to those skilled in the art.

The modified areas adjacent the edge of the film may, of course be removed with regular edge trim which removes the bead. Such trim may be recycled or disposed of in any other convenient manner. The quantities involved are, nevertheless insignificant in view of the overall quantity of film otherwise involved in rejected rolls which must be reworked, or receive special attention and treatment in slitting and re-winding.

Two alternative means of achieving gauge band oscillation according to the present invention involve cyclic variation of input power to fixed heaters positioned at corresponding locations above opposite edges of the film, and one or more variable jets of cooling air positioned in the tenter oven djaacent opposite edges of the film so that the cooling air impinges alternately on opposite edges of the film.

Referring to FIG. 2 which illusttrates an embodiment wherein heaters 8 and 9 are in fixed positions with respect to the moving film, alternating edge modification is achieved by oscillating the power input to the heater by means of controller 10, driven by reversing motor drive 11, through a mechanical coupling along line 12. Controller 10 is preferably a variable auto-transformer of a capacity sufficient to handle the power to the two heaters. Reversible rotary contact arm is coupled mechanically to motor drive 11; this drive is equipped with electrically operated duplex clutches (such as a "Simplatrol" model D) with an appropriate gear drive mechanism to enable instantaneous reversal of the rotor of the auto-transformer without stopping the motor. This produces a continuous variation from the maximum to the minimum, of the power input to one of the heaters, and from minimum to maximum power input into the other heater. It should be observed that while only one heater is shown at each location over the opposite edges of the film, a bank of several heaters may be employed as conditions require. The heaters should be positioned just inside the edge of the film so that, when at the maximum, a strip of a width of from one to three inches is heated depending on the extent of edge modification desired. The heaters shown in FIG. 2, while preferably positioned just before transverse direction stretching may be positioned on the interior of the tenter oven to heat the edges during stretching. The net effect would be the same as prior to stretching, but greater care must be exercised to avoid excessive heating, which added to the heat of the oven, would cause undue softening and tearing of the film under stress.

The embodiment employing variable jets of cooling air, illustrated in FIG. 3, relies on the toughening of strips along the edges during stretching in the tenter oven. Oven 16 is provided with means to heat film 15 during stretching by tenter chains 17 and 18, shown schematically, which have clips to grip the edges of the film as they follow on diverging tracks. These chains are driven by sprockets 19 and 20. Cooling air under pressure from pipe 21 is proportioned by valve 22, driven (by means not shown) along line 23, to direct the flow of cooling air alternately to jets 24 and jets 25. These jets are positioned over opposite edges of the film at the beginning of the stretch by the tenter chains. The air emerging from the jets impinges on a narrow width of the film parallel to the tenter chains along the divergent pathway on each edge of the film. The direction of impingement should be toward the edges so as to avoid turbulence which would cause non-uniform heating of the central portions 26 of the film. Optionally, skirts may be employed to prevent cooling air circulation over the heated central portions of the film. Control valve 22 may be a single proportioning valve which proportions the flow of air between the opposite groups of jets, or it may be a pair of needle valves coupled so that as one is closed the other is opened. The effect achieved is that the air flow changes gradually from the maximum to the minimum (preferably zero flow) gradually, alternating the flow to the group of jets on the opposite side, effecting a uniformly undulating modification of each edge. The cooling of the strips along the edges will cause variation in toughness of the edges, and resistance to stretching adjacent the tenter clips, to provide for the wave-like lateral displacement of gauge bands. Valve 22, if requiring reversal, may be driven by the reversing gear train and clutch combination employed with the variable input heaters described hereinbefore and illustrated in FIG. 2. The embodiment shown in FIG. 3 has the advantage that it is operable with films which cannot be crystallized, or if crystalline, cannot be further crystallized.

Obviously, other and alternative methods utilizing the principles and achieving the results herein described will be obvious to those skilled in the art and are within the purview of this invention.

The chief advantage of the method of this invention is that it can be adapted to flat film production. This enables the production of smooth, wrinkle free rolls where gauge deviation bands cannot otherwise be eliminated.

We claim:

1. A process for improving the roll-forming characteristics of continuous, organic, polymeric flat film which comprises, in combination, the steps of (1) continuously modifying to a predetermined degree the drawing characteristics of selected areas of a travelling continuous, drawable, organic, polymeric, flat film having at least one substantially straight longitudinal lane of a thickness which deviates from the average thickness across the film, in a predetermined path longitudinal of the film; and (2) continuously stretching the film in the transverse direction, whereby the longitudinal lane is displaced laterally alternately towards one edge and then toward the other edge of the film in a wave-like pattern.

2. A process for improving the roll-forming characteristics of continuous, thermoplastic, crystallizable organic, polymeric flat film which comprises, in combination, the steps of (1) continuously subjecting selected areas of a travelling continuous, thermoplastic drawable organic, polymeric, crystalline flat film capable of further crystallization and having at least one substantially straight longitudinal lane of a thickness which deviates from the average thickness across the film, to heat effective to further crystallize the film to a predetermined degree in a predetermined path longitudinal of the film; and (2) continuously stretching the film in the transverse direction, whereby the longitudinal lane is displaced laterally alternately towards one edge and then toward the other edge of the film in a wave-like pattern.

3. The process of claim 2 wherein the film capable of further crystallization is heated by heaters of equal heat output fixedly located in the path of travel of the film adjacent each edge of the film and the output of one heater is continuously varied cyclically from minimum to maximum output and vice versa while the output of the heater oppositely located adjacent the opposite edge of the film is continuously varied cyclically at the same rate from maximum to minimum output and vice versa.

4. The process of claim 2 wherein said selected areas are subjected to uniform heat.

5. A process for improving the roll-forming characteristics of continuous, organic, polymeric flat film which comprise, in combination, the steps of (1) continuously impinging on a travelling, continuous, drawable, organic, polymeric, flat film having at least one substantially straight longitudinal lane of a thickness which deviates from the average thickness across the film, two streams of cooling air effective to toughen said film, one stream being directed in a continuous longitudinal path adjacent one edge of the film, and the other stream being directed in a continuous longitudinal path adjacent the other edge of the film, the flow of one stream being continuously varied cyclically from a maximum to minimum flow and vice versa, while the flow of the other stream is continuously varied cyclically from a minimum to maximum flow and vice versa; and (2) continuously stretching the film in the transverse direction, whereby the longitudinal lane is displaced laterally alternately towards one edge and then toward the other edge of the film in a wave-like pattern.

References Cited
UNITED STATES PATENTS

| | | | |
|---|---|---|---|
| 2,412,187 | 12/1946 | Wiley et al. | 18—12 |
| 2,995,779 | 8/1961 | Winter | 264—289 |
| 3,223,766 | 12/1965 | Henze et al. | 264—288 |
| 3,265,789 | 8/1966 | Hofer | 264—288 |

JAMES A. SEIDLECK, *Primary Examiner.*

H. H. MINTZ, *Assistant Examiner.*